(12) United States Patent
Delaney et al.

(10) Patent No.: US 10,261,839 B2
(45) Date of Patent: Apr. 16, 2019

(54) OUTLIER AND ROOT CAUSE DETERMINATION OF EXCESSIVE RESOURCE USAGE IN A VIRTUAL MACHINE ENVIRONMENT

(71) Applicant: INTERNATIONAL BUSINESS MACHINES CORPORATION, Armonk, NY (US)

(72) Inventors: John V. Delaney, Kildalkey (IE); Anthony M. Hunt, Hopewell Junction, NY (US); David O'Grady, Maynooth (IE); Niamh Phelan, Newbridge (IE); Claus Schroeder-Hansen, Copenhagen (DK); Clea A. Zolotow, Key West, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

(21) Appl. No.: 15/341,285

(22) Filed: Nov. 2, 2016

(65) Prior Publication Data

US 2018/0121248 A1    May 3, 2018

(51) Int. Cl.
*G06F 9/46*    (2006.01)
*G06F 9/50*    (2006.01)
(Continued)

(52) U.S. Cl.
CPC ........ *G06F 9/5077* (2013.01); *G06F 9/45558* (2013.01); *G06F 11/3692* (2013.01);
(Continued)

(58) Field of Classification Search
CPC .................................................. G06F 9/45533
(Continued)

(56) References Cited

U.S. PATENT DOCUMENTS 7,636,918 B2 * 12/2009 Kadashevich ...... G06F 11/3466
                                                            709/223
8,055,951 B2 * 11/2011 Ben-Yehuda ....... G06F 9/45558
                                                              714/2
(Continued)

FOREIGN PATENT DOCUMENTS

EP          2430596       3/2012
WO       2010131001    11/2010

OTHER PUBLICATIONS

Mell et al., "The NIST Definition of Cloud Computing", NIST, Special Publication 800-145, Sep. 2011, 7 pages.

(Continued)

*Primary Examiner* — Mehran Kamran
(74) *Attorney, Agent, or Firm* — William Hartwell; Andrew D. Wright; Roberts Mlotkowski Safran Cole & Calderon, P.C.

(57) ABSTRACT

A computer-implemented method includes: monitoring, by a computing device, resource usage data for a hypervisor; monitoring, by the computing device, resource usage data for a guest machine; identifying, by the computing device, outliers in the resource usage data for the hypervisor and outliers in the resource usage data for the guest machine; executing, by the computing device, a root cause model based on the resource usage data for the hypervisor and the resource usage data for the guest machine; generating, by the computing device, a root cause report identifying results of the executed root cause model; and providing, by the computing device, the root cause report for display.

20 Claims, 8 Drawing Sheets

(51) Int. Cl.
    G06F 9/455    (2018.01)
    G06F 11/36    (2006.01)
(52) U.S. Cl.
    CPC .............. G06F 2009/45579 (2013.01); G06F 2009/45591 (2013.01)
(58) Field of Classification Search
    USPC .......................................................... 718/1
    See application file for complete search history.

(56) References Cited

U.S. PATENT DOCUMENTS

| | | | | |
|---|---|---|---|---|
| 8,140,301 | B2* | 3/2012 | Abe | G05B 17/02 703/2 |
| 8,230,262 | B2* | 7/2012 | Li | G06F 11/008 714/26 |
| 8,347,268 | B2* | 1/2013 | Caprihan | G06F 11/3409 700/108 |
| 8,555,287 | B2 | 10/2013 | Ding et al. | |
| 8,706,798 | B1* | 4/2014 | Suchter | G06F 9/5038 709/202 |
| 8,966,475 | B2* | 2/2015 | Srinivasan | G06F 9/5077 717/174 |
| 9,075,645 | B2* | 7/2015 | Heninger | G06F 9/45533 |
| 9,349,103 | B2* | 5/2016 | Eberhardt, III | G06N 7/005 |
| 2004/0133395 | A1* | 7/2004 | Ding | H04L 67/22 702/182 |
| 2007/0028219 | A1* | 2/2007 | Miller | G05B 23/021 717/124 |
| 2008/0059972 | A1* | 3/2008 | Ding | G06F 9/505 718/105 |
| 2009/0063806 | A1* | 3/2009 | Logan | G06F 9/5016 711/173 |
| 2011/0004935 | A1* | 1/2011 | Moffie | G06F 21/53 726/23 |
| 2011/0119667 | A1* | 5/2011 | Srinivasan | G06F 11/301 718/1 |
| 2011/0231704 | A1* | 9/2011 | Ge | G06F 11/0709 714/26 |
| 2012/0054554 | A1* | 3/2012 | Dagan | G06F 11/0712 714/39 |
| 2012/0198454 | A1* | 8/2012 | Dawson | G06F 9/526 718/100 |
| 2013/0132778 | A1* | 5/2013 | Dagan | H04L 41/065 714/37 |
| 2013/0283273 | A1* | 10/2013 | Miyazaki | G06F 9/45533 718/1 |
| 2014/0047439 | A1* | 2/2014 | Levy | H04L 67/34 718/1 |
| 2014/0165054 | A1* | 6/2014 | Wang | G06F 9/45558 718/1 |
| 2015/0106324 | A1* | 4/2015 | Puri | G06N 5/04 706/52 |
| 2015/0277959 | A1* | 10/2015 | Higuchi | G06F 9/45558 718/1 |
| 2015/0355924 | A1* | 12/2015 | Holla | G06F 9/45558 718/1 |
| 2016/0062950 | A1* | 3/2016 | Brodersen | G06F 17/18 702/181 |
| 2016/0085578 | A1* | 3/2016 | Bhide | G06F 9/45558 718/1 |
| 2016/0217022 | A1* | 7/2016 | Velipasaoglu | G06F 11/079 |
| 2017/0004002 | A1* | 1/2017 | Nakamura | G06F 9/5077 |
| 2017/0034001 | A1* | 2/2017 | Dagan | H04L 41/12 |
| 2017/0147383 | A1* | 5/2017 | Hudzia | G06F 9/45558 |
| 2017/0329660 | A1* | 11/2017 | Salunke | G06F 11/079 |
| 2017/0373937 | A1* | 12/2017 | Hovhannisyan | H04L 41/0853 |
| 2018/0012571 | A1* | 1/2018 | Tsirkin | G09G 5/397 |
| 2018/0034685 | A1* | 2/2018 | Naous | H04L 41/22 |

OTHER PUBLICATIONS

Cherkasova et al., "Automated Anomaly Detection and Performance Modeling of Enterprise Applications", http://www.hpl.hp.com/personal/Lucy_Cherkasova/papers/ace-tocs.pdf, ACM TOCS, Accessed Oct. 31, 2016, 30 Pages.

Outlier, https://en.wikipedia.org/wiki/Outlier, Wikipedia, Accessed Jun. 8, 2016, 9 Pages.

Qianqian et al., "Bayesian methods for outliers detection in GNSS time series", J Geod (2013) 87:609-627, May 8, 2013, 19 Pages.

Bayesian network, https://en.wikipedia.org/wiki/Bayesian_network, Wikipedia, Accessed Nov. 2, 2016, 14 Pages.

* cited by examiner

OUTLIER AND ROOT CAUSE DETERMINATION OF EXCESSIVE RESOURCE USAGE IN A VIRTUAL MACHINE ENVIRONMENT

BACKGROUND

The present invention generally relates to root cause determination of excessive resource usage and, more particularly, to root cause determination of excessive resource usage using Bayesian Acyclic graphs.

A virtual machine is a software-based emulation of a computer system in which multiple emulated computing devices may operate on a single physical computing device. A hypervisor may run and manage a number of different virtual machines (each called "guest machines") on a single computer device. Each guest machine may implement different operating systems and/or applications. For example, one guest machine may be used to host a financial data processing system for customers, whereas a different guest machine may be used to host an online gaming platform. Virtual machines are often used in cloud-based environments to provide a multitude of services to cloud-connected clients. Computing resources consumed by hypervisors and virtual machines can be substantial since software is used to emulate the functions of hardware.

SUMMARY

In an aspect of the invention, a computer-implemented method includes: monitoring, by a computing device, resource usage data for a hypervisor; monitoring, by the computing device, resource usage data for a guest machine; identifying, by the computing device, outliers in the resource usage data for the hypervisor and outliers in the resource usage data for the guest machine; executing, by the computing device, a root cause model based on the resource usage data for the hypervisor and the resource usage data for the guest machine; generating, by the computing device, a root cause report identifying results of the executed root cause model; and providing, by the computing device, the root cause report for display.

In an aspect of the invention, there is a computer program product for identifying the root cause of outliers representing excess computing usage in a virtual machine system. The computer program product comprises a computer readable storage medium having program instructions embodied therewith, the program instructions executable by a computing device to cause the computing device to: monitor resource usage data for a hypervisor; monitor resource usage for a guest machine; identify outliers in the resource usage data for the hypervisor and outliers in the resource usage data for the guest machine, wherein the outliers represent excessive computing resource utilization by a server device hosting the hypervisor and the guest machine; execute a root cause model based on the resource usage data for the hypervisor and the resource usage data for the guest machine; generate a root cause report identifying results of the executed root cause model; and provide the root cause report for display In an aspect of the invention, a system includes: a CPU, a computer readable memory and a computer readable storage medium associated with a computing device; program instructions to receive a first set of time series data pertaining to a hypervisor and a second set of time series data pertaining to a guest associated with the hypervisor; program instructions to determine a first set of outliers in the first set of time series data, and a second set of outliers in the second set of time series data; program instructions to determine a correlation between the first set of time series data and the second set of time series data to determine whether the first set of time series data and the second set of time series data include one or more contiguous time series points; program instructions to, on condition that the first set of time series data and the second set of time series data are determined to include one or more contiguous time series points, provide the first set of time series data, the second set of time series data, and the contiguous time series points as inputs to a directed acyclic graph to determine whether the outliers are a result of a spinning process or genuine workload; program instructions to, on condition that the first set of time series data and the second set of time series data are determined to not include any contiguous time series points, separately provide the first set of time series data as input to a first instance of the directed acyclic graph and provide the second set of time series data as input to a second instance of the directed acyclic graph to determine whether the outliers are a result of a spinning process or genuine workload; program instructions to generate a root cause report identifying results of the executed root cause model; and program instructions to provide the root cause report for display. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
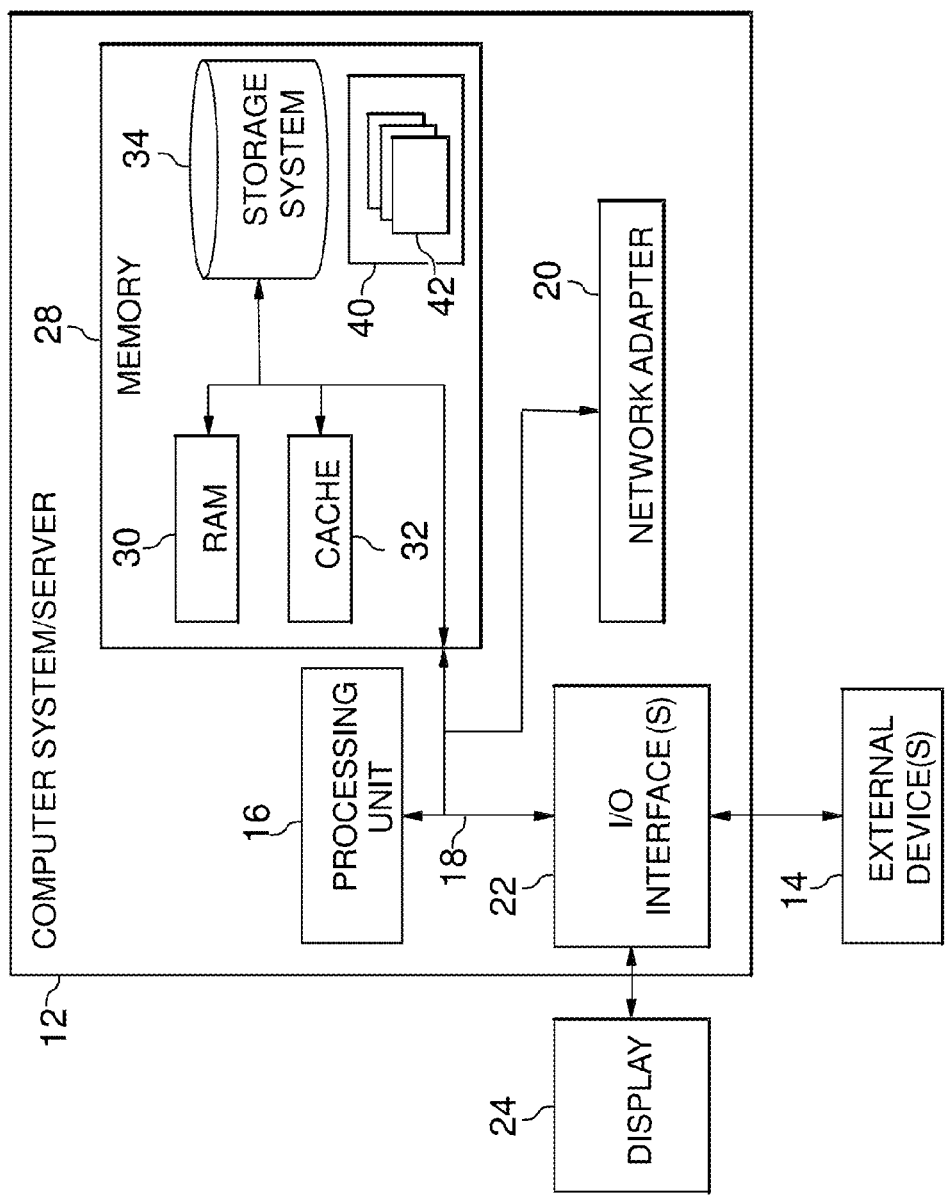
FIG. 1 depicts a cloud computing node according to an embodiment of the present invention.

The present invention generally relates to root cause determination of excessive resource usage and, more particularly, to root cause determination of excessive resource usage using Bayesian Acyclic graphs. As described herein, aspects of the prevent invention may monitor computer resource consumption by a hypervisor and a guest (e.g., guest machine), monitor performance data of an application, determine outlier data (e.g., excessive resource consumption by the hypervisor and/or guest machine), and correlate data between a hypervisor and guest to determine the root cause of the outlier. As described herein, a Bayesian probabilistic directed acyclic graphic model (also referred to as a "Bayesian network model") may be used to determine the root cause of an outlier. For example, a Bayesian network model may be used to determine if the root cause of an outlier is machine generated (e.g., a "spinning" process associated with defective code that causes excessive CPU resource utilization) or if the root cause is due to heavy workloads (e.g., during a time period in which workloads are expected or known to be above average, such a deadline for filing financial documents).

As described herein, a low correlation of resource usage between a guest machine and the hypervisor may indicate a potential issue with the guest machine and/or hypervisor (e.g., a memory leak, circular/spinning process, or the like). Accordingly, aspects of the present invention may identify when the correlation of resource usage between a guest machine and the hypervisor drops below a threshold (or is otherwise considered an outlier). Based on identifying an outlier, aspects of the present invention may execute a Bayesian network model with sets of time series data associated with the resource usage of the hypervisor and the guest machine as inputs to the network model (e.g., inputs to a Bayesian network model, a directed acyclic graph, or the like). In this way, the root cause of an outlier (e.g., relating to excessive resource utilization) can be determined.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
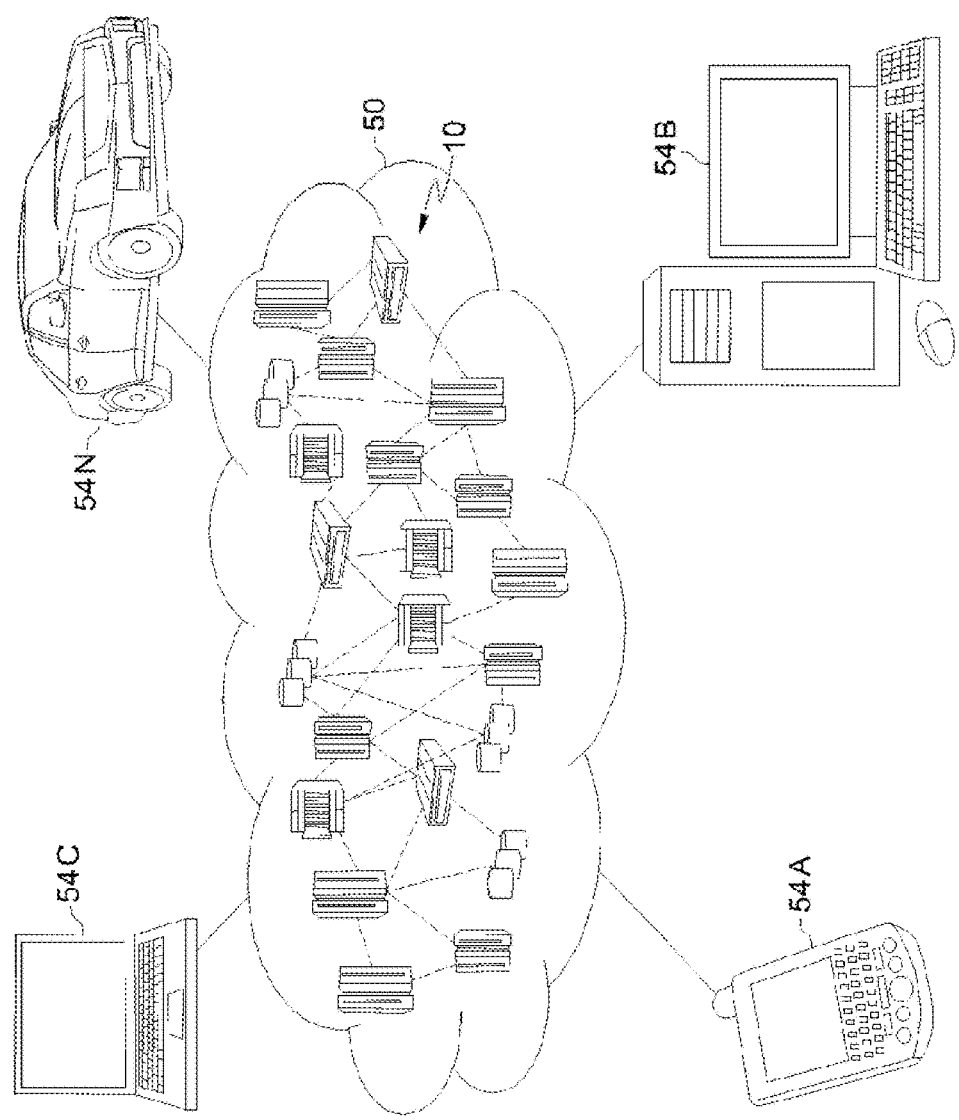
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
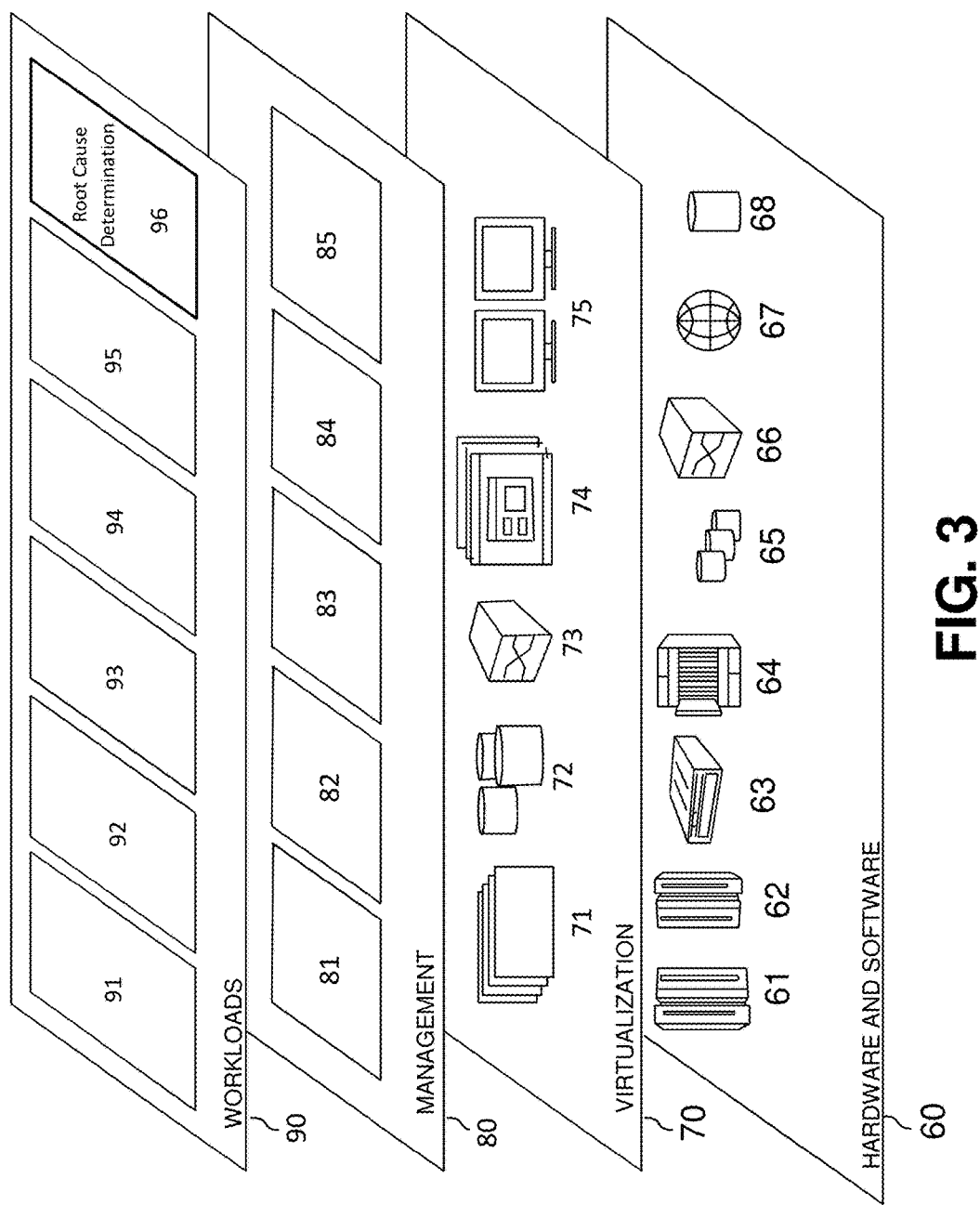
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and root cause determination 96.

Referring back to FIG. 1, the program/utility 40 may include one or more program modules 42 that generally carry out the functions and/or methodologies of embodiments of the invention as described herein (e.g., such as the functionality provided by root cause determination 96). Specifically, the program modules 42 may monitor computing resource usage data on a hypervisor and guest machine, identify outliers in the usage data, and apply a model (e.g., a Bayesian network model and/or acyclic graph) to outlier data sets to determine the root cause of data. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of outlier detection and root cause determination server as shown in FIG. 4.

Figure 4:
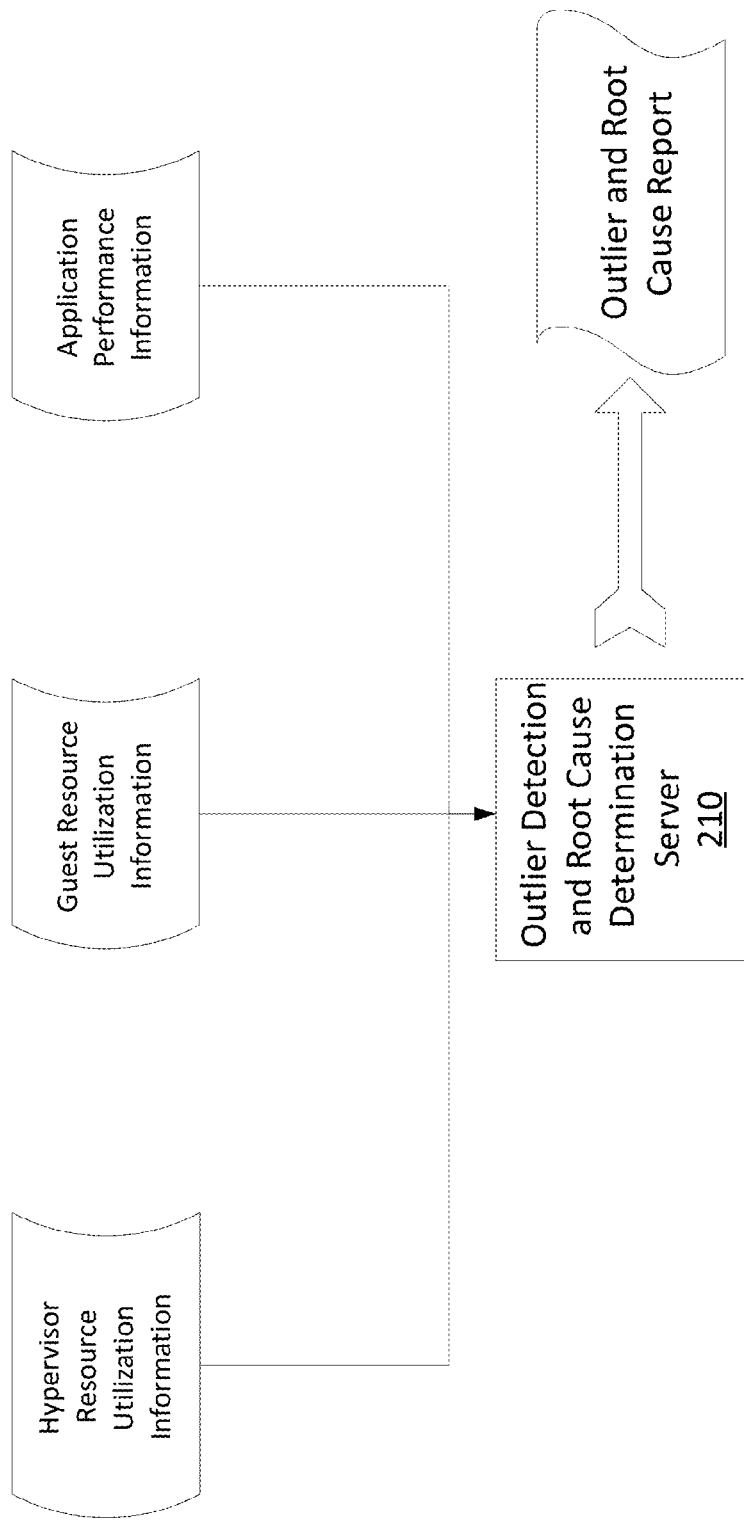
FIG. 4 shows an overview of an example implementation in accordance with aspects of the present invention

FIG. 4 shows an overview of an example implementation in accordance with aspects of the present invention. As shown in FIG. 4, an outlier detection and root cause determination server 210 may receive and monitor hypervisor resource utilization information, guest resource utilization information, and application performance information. As described herein, the hypervisor resource utilization information may include computing resource utilization (e.g., CPU utilization, memory usage, etc.) consumed on a virtual machine server by a hypervisor hosted by the virtual machine server. In some embodiments, the hypervisor resource utilization information may include "MON-WRITE" data and may be received at recurring intervals of time (e.g., every two seconds, four seconds, etc.). Additionally, or alternatively, the hypervisor resource utilization information may be received in accordance with parameters defined by a performance toolkit in which data is received more frequently based on the occurrence of an event. Additionally, or alternatively, the hypervisor resource utilization information may include resource utilization for virtual machines as well as containers running under certain images.

The guest resource utilization information may include computing resource utilization consumed on the virtual machine server (e.g., CPU utilization, memory usage, etc.) consumed by a guest machine hosted by the hypervisor. The guest resource utilization information may include SMF data, such as SMF 104 data, or the like. The application performance information may include response time of one or more applications running on the guest machine and/or hypervisor. As described herein, the hypervisor resource utilization information and the guest resource utilization information may include time series data representing computing resource utilization at different points in time.

As the outlier detection and root cause determination server 210 receives and monitors the hypervisor resource utilization information, guest resource utilization information, and application performance information, the outlier detection and root cause determination server 210 may correlate the hypervisor resource utilization time series data with the guest machine resource utilization time series data. The outlier detection and root cause determination server 210 may detect outliers in the hypervisor and guest machine time series data sets. Further, the outlier detection and root cause determination server 210 may detect outliers in the correlation between the hypervisor resource utilization data and the guest machine resource utilization data (e.g., when the correlation between the hypervisor resource utilization and the guest machine resource utilization is relatively low). In embodiments, the outlier detection and root cause determination server 210 may detect outliers using any combination of outlier detection techniques (e.g., a Tau test, standard deviation comparison, etc.). The outlier detection and root cause determination server 210 may also detect outliers in the application performance information. As described herein, the outliers may represent a potential issue (e.g., high resource utilization due to excessive workload, memory leak, circular and/or spinning process, defective code, etc.).

Based on detecting the outliers, the outlier detection and root cause determination server 210 may execute a model (e.g., a Bayesian network model) to determine the root cause of the outliers. For example, the Bayesian network model may be used to identify whether the root cause of an outlier is due to excessive workload, a spinning process, etc.). In embodiments, the outlier detection and root cause determination server 210 may determine, based on the correlating, whether the hypervisor time series data set and the guest machine time series data set include one or more contiguous time series points. In embodiments, the outlier detection and root cause determination server 210 may use the hypervisor time series data set, the guest machine time series data set, and the contiguous time series points as inputs to the network model (e.g., inputs to a directed acyclic graph) to determine whether outliers are considered "normal" (e.g., related to "genuine" workload) or "abnormal" (e.g., machine related, such as from a memory leak, spinning process, etc.). As described herein, a "genuine" workload is considered to be a workload that is connection with an intended process for an application, whereas a spinning process is considered to be related to an abnormal process, such as a memory leak, defective code, circular code, etc.

Additionally, or alternatively, the outlier detection and root cause determination server 210 may monitor a time data set representing the combined performance/resource utilization of the hypervisor and guest machine. The outlier detection and root cause determination server 210 may determine outliers from the time data set representing the combined performance/resource utilization of the hypervisor and guest machine. Further, the outlier detection and root cause determination server 210 may correlate the time data set of the combined performance/resource utilization with the time data set of the hypervisor to determine whether the data set of the combined performance includes contiguous time series points with the hypervisor time data set. If contiguous time series points are present, the outlier detection and root cause determination server 210 may use the hypervisor time dataset, the guest machine time dataset, and the combined performance time data set as inputs to the network model (e.g., inputs to an acyclic graph) to determine the root cause of the outliers (e.g., determine if the outliers are normal, abnormal, etc.). If contiguous time series points are not present (e.g., as determined based on the correlating), the hypervisor time dataset and the guest machine time dataset may be used as inputs to separate instances of the network model to determine the root cause of the outliers.

As further shown in FIG. 4, the outlier detection and root cause determination server 210 may generate a report that identifies the outliers and the root cause of the outliers. For example, the report may be in the form of a Bayesian network chart having conditional probability tables, an acyclic graph, a forest graph, a ploytree, or the like. From the network chart, a root cause of an outlier (e.g., the root cause of excess resource utilization) may be presented (e.g., as further shown in FIG. 8). For example, the root cause may be determined to be likely workload based in which high resource utilization is due to an event in which the guest machine and/or hypervisor are process an above average amount of data related to "genuine" workload. As an example, high resource utilization may be "normal," understandable and/or expected on a day or time period in which traffic and/or usage of the guest machine is expected to be relatively high (e.g., on a day of a deadline to file taxes or provide other documents to a processing system). As another example, the root cause may be determined to be machine generated caused by a spinning process related to defective code, memory leak, or the like. In this way, administrators of a virtual machine system may identify when a root cause is considered "abnormal" as in the case when an outlier is a result of a spinning process related to defective code. Further, the administrators may be notified to take corrective action to address an abnormal outlier.

Figure 5:
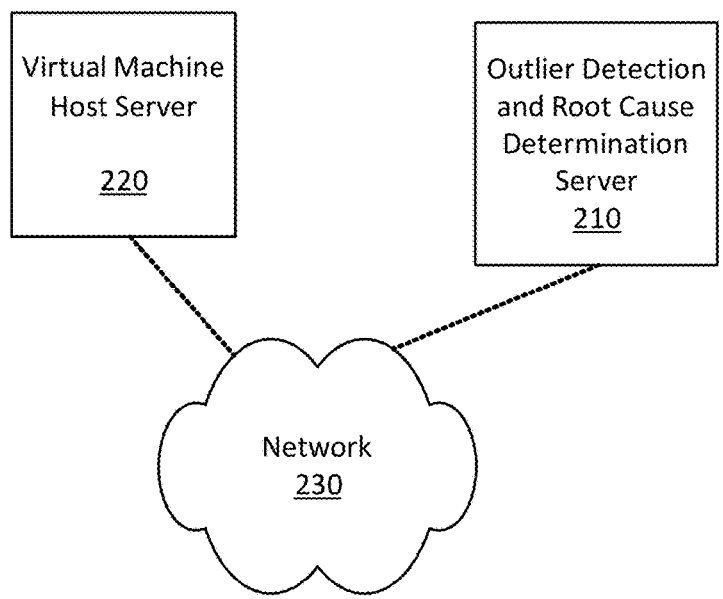
FIG. 5 shows an example environment in accordance with aspects of the present invention.

FIG. 5 shows an example environment in accordance with aspects of the present invention. As shown in FIG. 5, environment 500 may include an outlier detection and root cause determination server 210, a virtual machine host server 220, and/or network 230. In embodiments, one or more components in environment 500 may include one or more of the components of computer system/server 12 of FIG. 1.

The outlier detection and root cause determination server 210 may include one or more computer and/or server devices that monitors and tracks computing resource usage and/or performance data regarding a hypervisor and/or guest machine implemented by the virtual machine host server 220. As described herein, the outlier detection and root cause determination server 210 may detect outliers in time series data representing the resource usage, and may determine the root cause of the outliers using, for example, Bayesian networks, acyclic graphs, probability matrices, etc. The outlier detection and root cause determination server 210 may generate a report that displays an outlier and its root cause.

The virtual machine host server 220 may include one or more computer and/or server devices that host a hypervisor and a guest machine. In embodiments, the virtual machine host server 220 may communicate with the outlier detection and root cause determination server 210 to provide the outlier detection and root cause determination server 210 with computing resource usage and/or performance data regarding a hypervisor and/or guest machine.

The network 230 may include network nodes, such as network nodes 10 of FIG. 2. Additionally, or alternatively, the network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 235 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
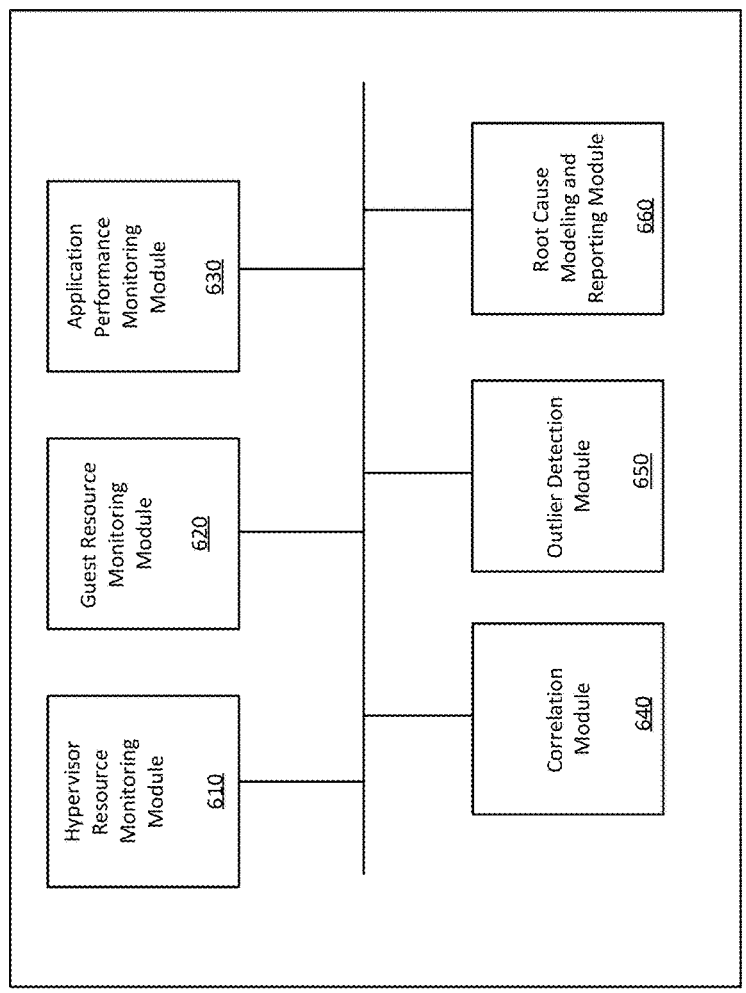
FIG. 6 shows a block diagram of example components of an outlier and root cause determination server in accordance with aspects of the present invention.

FIG. 6 shows a block diagram of example components of an outlier detection and root cause determination server 210 in accordance with aspects of the present invention. As shown in FIG. 6, the outlier detection and root cause determination server 210 may include a hypervisor resource monitoring module 610, a guest resource monitoring module 620, an application performance monitoring module 630, a correlation module 640, an outlier detection module 650, and a root cause modeling and reporting module 660. In embodiments, the outlier detection and root cause determination server 210 may include additional or fewer components than those shown in FIG. 6. In embodiments, separate components may be integrated into a single computing component or module. Additionally, or alternatively, a single component may be implemented as multiple computing components or modules.

The hypervisor resource monitoring module 610 may include a program module (e.g., program module 42 of FIG. 1) that receives computing resource usage information for a hypervisor hosted by the virtual machine host server 220. In some embodiments, the hypervisor resource utilization information may include "MONWRITE" data and may be received at recurring intervals of time (e.g., every two seconds, four seconds, etc.). Additionally, or alternatively, the hypervisor resource utilization information may be received in accordance with parameters defined by a performance toolkit in which data is received more frequently based on the occurrence of an event. Additionally, or alternatively, the hypervisor resource utilization information may include resource utilization for virtual machines as well as containers running under certain images. The hypervisor resource utilization information may include time series data representing computing resource utilization at different points in time.

The guest resource monitoring module 620 may include a program module (e.g., program module 42 of FIG. 1) that receives guest resource utilization information (e.g., computing resource usage information for a guest machine hosted by the virtual machine host server 220). The guest resource utilization information may include computing resource utilization consumed on the virtual machine server (e.g., CPU utilization, memory usage, etc.) consumed by a guest machine hosted by the hypervisor. The guest resource utilization information may include SMF data, such as SMF 104 data, or the like. Additionally, or alternatively, the guest resource utilization information may include any performance metrics available on a virtual machine or guest. The guest resource utilization information may include time series data representing computing resource utilization at different points in time.

The application performance monitoring module 630 may include a program module (e.g., program module 42 of FIG. 1) that receives application performance information for applications running on the hypervisor and/or the guest machine. The application performance information may include response time of one or more applications running on the guest machine and/or hypervisor.

The correlation module 640 may include a program module (e.g., program module 42 of FIG. 1) that correlates the hypervisor resource utilization time series data with the guest machine resource utilization time series data (e.g., using any combination of statistical correlation techniques). Based on the correlating, the correlation module 640 may determine whether the hypervisor time series data set and the guest machine time series data set include one or more contiguous time series points. In embodiments, the correlation module 640 may also correlate a time data set of the combined performance/resource utilization of the hypervisor and guest machine with the time data set of the hypervisor to determine whether the data set of the combined performance includes contiguous time series points with the hypervisor time data set.

The outlier detection module 650 may include a program module (e.g., program module 42 of FIG. 1) that detects outliers in the hypervisor and guest machine time series data sets. Further, the outlier detection module 650 may detect outliers in the correlation between the hypervisor resource utilization data and the guest machine resource utilization data (e.g., when the correlation between the hypervisor resource utilization and the guest machine resource utilization is relatively low). In embodiments, the outlier detection module 650 may detect outliers using any combination of outlier detection techniques (e.g., a Tau test, standard deviation comparison, etc.). The outlier detection module 650 may also detect outliers in the application performance information. As described herein, the outliers may represent a potential issue (e.g., high resource utilization due to excessive workload, memory leak, circular and/or spinning process, defective code, etc.).

The root cause modeling and reporting module 660 may include a program module (e.g., program module 42 of FIG. 1) that may execute a model (e.g., a Bayesian network model) to determine the root cause of the outliers. Additionally, or alternatively, the root cause modeling and reporting module 660 may utilize another technique to determine the root cause of outliers (e.g., probability matrices, acyclic graphs, etc.). The Bayesian network model (or other model, graph, matrix, etc.) may be used to identify whether the root cause of an outlier is due to excessive workload, a spinning process, etc. In embodiments, the root cause modeling and reporting module 660 may use the hypervisor time series data set, the guest machine time series data set, and contiguous time series points (e.g., if contiguous time series points are present as is determined by the correlating as described above) as inputs to the network model (e.g., inputs to an acyclic graph) to determine whether outliers are considered "normal" (e.g., workload related) or "abnormal" (e.g., machine related, such as from a memory leak, spinning process, etc.).

Additionally, or alternatively, the root cause modeling and reporting module 660 may determine outliers from a time data set representing the combined performance/resource utilization of the hypervisor and guest machine. If contiguous time series points are present (e.g., based on correlating the combined performance/resource utilization time data set with the hypervisor resource utilization time data set), the root cause modeling and reporting module 660 may use the hypervisor time dataset, the guest machine time dataset, and the combined performance time data set as inputs to the network model (e.g., inputs to an acyclic graph) to determine the root cause of the outliers (e.g., determine if the outliers are normal, abnormal, etc.). If contiguous time series points are not present (e.g., as determined based on the correlating), the hypervisor time dataset and the guest machine time dataset may be used as inputs to separate instances of the network model to determine the root cause of the outliers. For any set of random variables, the probability of any member of a joint distribution can be calculated from conditional probabilities using the chain rule (given a topological ordering).

The root cause modeling and reporting module 660 may generate a report that identifies the outliers and/or the root cause of the outliers. For example, the report may be in the form of a Bayesian network chart having conditional probability tables, an acyclic graph, a forest graph, a polytree, or the like. From the network chart, a root cause of an outlier (e.g., the root cause of excess resource utilization) may be presented (e.g., as further shown in FIG. 8). For example, the root cause may be determined to be likely workload based in which high resource utilization is due to an event in which the guest machine and/or hypervisor are process an above average amount of data. In this way, administrators of a virtual machine system may identify when a root cause is considered "abnormal" as in the case when an outlier is a result of a spinning process related to defective code. Further, the administrators may be notified to take corrective action to address an abnormal outlier.

Figure 7:
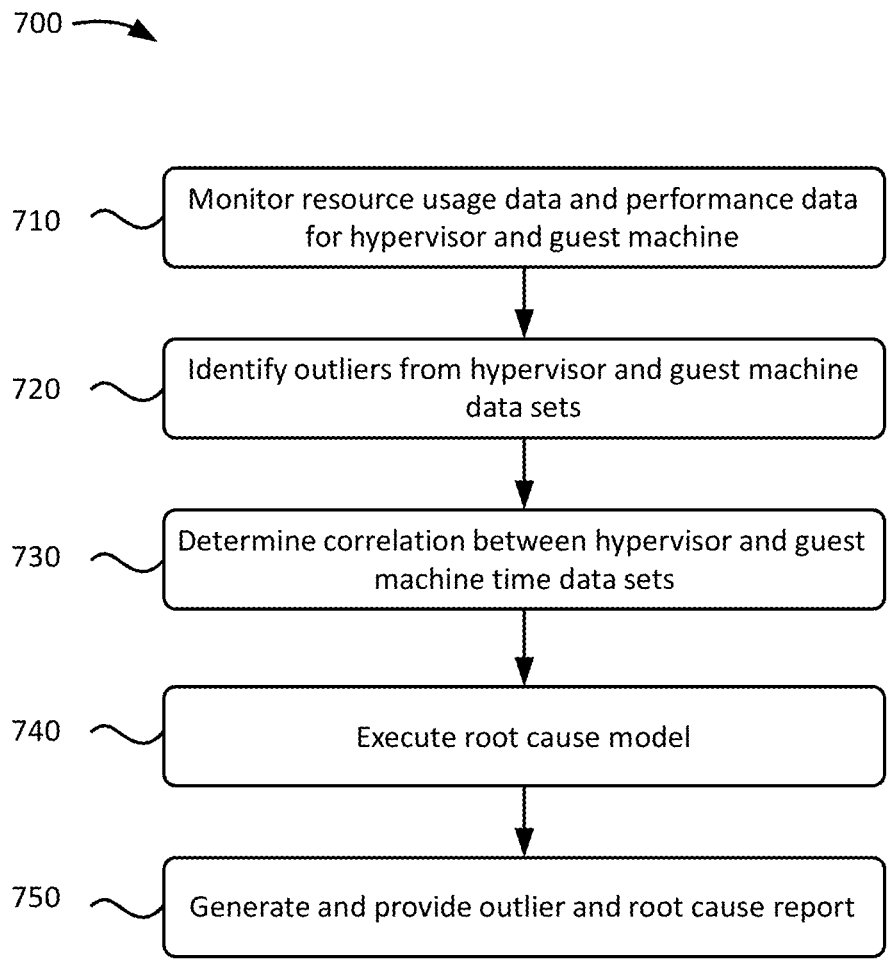
FIG. 7 shows an example flowchart for detecting outliers in data representing computing resource utilization by a virtual machine system and determining the root cause of the outliers.

FIG. 7 shows an example flowchart for detecting outliers in data representing computing resource utilization by a virtual machine system and determining the root cause of the outliers. The steps of FIG. 7 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 7, process 700 may include monitoring resource usage data and performance data for a hypervisor and guest machine (step 710). For example, as described above with respect to the hypervisor resource monitoring module 610, guest resource monitoring module 620, and application performance monitoring module 630, the outlier detection and root cause determination server 210 may monitor resource usage data and performance data for a hypervisor and guest machine. In embodiments, the outlier detection and root cause determination server 210 may store time series data set for the hypervisor resource utilization and a separate time series data set for the guest machine resource utilization.

Process 700 may further include identifying outliers from the hypervisor and guest machine data sets (step 720). For example, as described above with respect to the outlier detection module 650, the outlier detection and root cause determination server 210 may detect outliers using any combination of outlier detection techniques (e.g., a Modified Thompson Tau test, standard deviation comparison, etc.). The outlier detection module 650 may also detect outliers in the application performance information. As described herein, the outliers may represent a potential issue (e.g., high resource utilization due to excessive workload, memory leak, circular and/or spinning process, defective code, etc.).

Process 700 may further include determining a correlation between hypervisor and guest machine time data sets (step 730). For example, as described above with respect to the correlation module 640, the outlier detection and root cause determination server 210 may correlate the hypervisor resource utilization time series data with the guest machine resource utilization time series data. Based on the correlating, the correlation module 640 may determine whether the hypervisor time series data set and the guest machine time series data set include one or more contiguous time series points. In embodiments, the correlation module 640 may also correlate a time data set of the combined performance/resource utilization of the hypervisor and guest machine with the time data set of the hypervisor to determine whether the data set of the combined performance includes contiguous time series points with the hypervisor time data set.

Process 700 may also include executing a root cause model (step 740). For example, as described above with respect to the root cause modeling and reporting module 660, the outlier detection and root cause determination server 210 may execute a model (e.g., a Bayesian network model) to determine the root cause of the outliers. Additionally, or alternatively, the outlier detection and root cause determination server 210 may utilize another technique to determine the root cause of outliers (e.g., probability matrices, acyclic graphs, etc.). The Bayesian network model (or other model, graph, matrix, etc.) may be used to identify whether the root cause of an outlier is due to excessive workload, a spinning process, etc. In embodiments, the outlier detection and root cause determination server 210 may use the hypervisor time series data set, the guest machine time series data set, and contiguous time series points (e.g., if contiguous time series points are present as is determined by the correlating as described above) as inputs to the network model (e.g., inputs to an acyclic graph) to determine whether outliers are considered "normal" (e.g., workload related) or "abnormal" (e.g., machine related, such as from a memory leak, spinning process, etc.).

Additionally, or alternatively, the outlier detection and root cause determination server 210 may determine outliers from a time data set representing the combined performance/resource utilization of the hypervisor and guest machine. If contiguous time series points are present (e.g., based on correlating the combined performance/resource utilization time data set with the hypervisor resource utilization time data set), the outlier detection and root cause determination server 210 may use the hypervisor time dataset, the guest machine time dataset, and the combined performance time data set as inputs to the network model (e.g., inputs to an acyclic graph) to determine the root cause of the outliers (e.g., determine if the outliers are normal, abnormal, etc.). If contiguous time series points are not present (e.g., as determined based on the correlating), the hypervisor time dataset and the guest machine time dataset may be used as inputs to separate instances of the network model to determine the root cause of the outliers.

Process 700 may also include generating and providing a root cause report (step 750). For example, as described above with respect to the root cause modeling and reporting module 660, the outlier detection and root cause determination server 210 may generate a report that identifies the outliers and the root cause of the outliers. For example, the report may be in the form of a Bayesian network chart having conditional probability tables, an acyclic graph, a forest graph, a ploytree, or the like. From the network chart, a root cause of an outlier (e.g., the root cause of excess resource utilization) may be presented. In embodiments, the outlier detection and root cause determination server 210 may provide the root cause report for display (e.g., to a user and/or an administrator).

Figure 8:
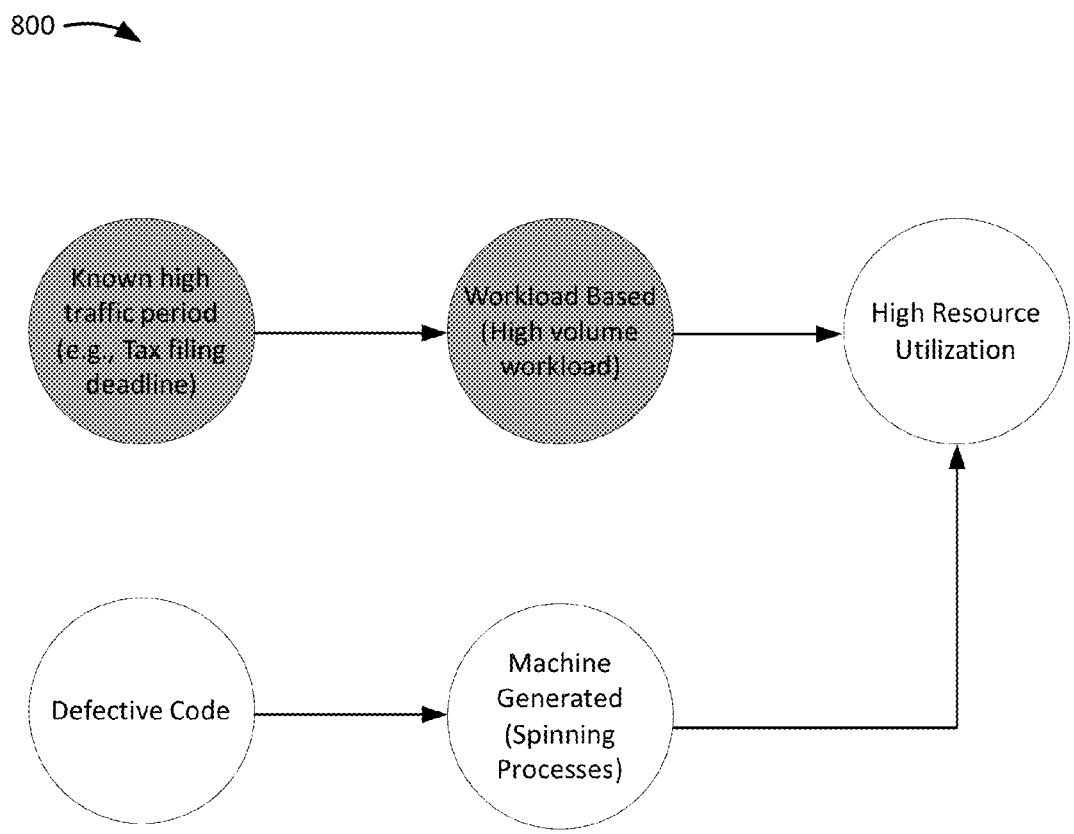
FIG. 8 shows an example root cause report that may be provided by an outlier and root cause determination server in accordance with aspects of the present invention.

FIG. 8 shows an example root cause report that may be provided by the outlier detection and root cause determination server 210 in accordance with aspects of the present invention. As shown FIG. 8, the root cause report 800 may be in the form of a Bayesian network and/or an acyclic graph. For example, the cause of an end result (e.g., high resource utilization) may be workload based (e.g., caused by a high volume of workload) or may be machine generated (e.g., caused by a spinning process). The report may visually indicate the likely cause of the high resource utilization (e.g., in the form of colors, shadings, highlighting, icons, etc.). In the example shown, the root cause report 800 may indicate that the high resource utilization is workload based caused by a high volume workload. Further, the root cause report 800 may show that the high volume workload was due to a known high traffic period (e.g., deadline for filing taxes). In embodiments, the outlier detection and root cause determination server 210 may link a high volume workload event with a database identifying known high traffic periods that may result in a high volume workload. Based on the linking, the outlier detection and root cause determination server 210 may generate the root cause report 800 to show that the high volume workload may likely be a result of the known high traffic period. Alternatively, the root cause report 800 may not indicate the known high traffic period, and an administrator may perform an external analysis to determine the cause of the high volume workload.

While the root cause report 800 may or may not identify a known high traffic period, the root cause report 800 may more importantly identify whether high resource utilization was workload based or machine generated. As described herein, a workload based cause for high resource utilization may be considered to be "normal," expected, and/or acceptable, whereas high resource utilization due to a spinning process may indicate a potential issue to be corrected. Thus, the root cause report 800 may indicate to administrators whether corrective action and/or further investigation is needed to correct a potential issue, such as defective code and/or other cause of a spinning process. Also, while FIG. 8 shows an example, the root cause report 800 may differ than what is shown and may have a different format and may include additional or less information that is shown.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    monitoring, by a computing device, resource usage data for a hypervisor;
    monitoring, by the computing device, resource usage data for a guest machine;
    identifying, by the computing device, both outliers in the resource usage data for the hypervisor and outliers in the resource usage data for the guest machine;
    executing, by the computing device, a root cause model based on both the resource usage data for the hypervisor and the resource usage data for the guest machine;
    on condition that a first set of time series data associated with the hypervisor and a second set of time series data associated with the guest machine are determined to include one or more contiguous time series points, providing, by the computing device, the first set of time series data, the second set of time series data, and the contiguous time series points as inputs to a directed acyclic graph to determine whether the outliers are a result of a spinning process or genuine workload;
    generating, by the computing device, a root cause report identifying results of the executed root cause model and the acyclic graph, wherein the root cause report identifies a root cause of both the outliers in the resource usage data for the hypervisor and the outliers in the resource usage data for the guest machine; and
    providing, by the computing device, the root cause report for display to provide information to an administrator to take corrective action to address an issue related to the root cause of the outliers in the resource usage data for the hypervisor and the outliers in the resource usage data for the guest machine.

2. The method of claim 1, wherein the executing the root cause model comprises executing the root cause model using the resource usage data usage for the hypervisor and the resource usage data for the guest machine as inputs to the root cause model.

3. The method of claim 2, further comprising:
    correlating the resource usage data usage for the hypervisor with the resource usage data for the guest machine; and
    determining whether contiguous time series points are present between the resource usage data usage for the hypervisor and the resource usage data for the guest machine based on the correlating,
    wherein the executing the root cause model comprises:
        executing a single instance of the root cause model using the resource usage data usage for the hypervisor and the resource usage data for the guest machine as inputs when the contiguous time series points exist; and
        executing separate instances of the root cause model using the resource usage data usage for the hypervisor and the resource usage data for the guest machine set as separate inputs to each instance of the root cause model when the contiguous time series points do not exist.

4. The method of claim 1, further comprising:
    monitoring combined resource usage data for the hypervisor and the guest machine; and
    identifying a set of outliers in the combined resource usage data;
    wherein the executing the root cause model comprises executing the root cause model using the resource usage data usage for the hypervisor, the resource usage data for the guest machine, and the combined resource usage data as inputs to the root cause model.

5. The method of claim 1, wherein the outliers represent excessive computing resource utilization, and the root cause report indicates whether the excessive computing resource utilization is related to genuine workload or to a spinning process.

6. The method of claim 1, wherein the root cause model is selected from a group consisting of:
    a Bayesian network,
    a probability matrix, and
    an acyclic graph.

7. The method of claim 1, wherein the root cause report includes an item selected from a group consisting of:
    a Bayesian network
    a probability matrix,
    an acyclic graph,
    a forest graphs, and
    a polytree.

8. The method of claim 1, further comprising monitoring application performance, wherein the executing the root cause model is further based on the application performance.

9. The method of claim 1, wherein the outliers are identified based on a technique selected from a group consisting of:
    a standard deviation comparison, and
    a Tau test.

10. The method of claim 1, wherein a service provider at least one of creates, maintains, deploys and supports the computing device.

11. The method of claim 1, wherein the monitoring the resource usage data for the hypervisor, the monitoring the resource usage data for the guest machine, the identifying, the executing, the generating, and the providing are provided by a service provider on a subscription, advertising, and/or fee basis.

12. The method of claim 1, wherein the computing device includes software provided as a service in a cloud environment.

13. The method of claim 1, further comprising deploying a system for identifying the root cause of outliers representing excess computing usage in a virtual machine system, comprising providing a computer infrastructure operable to perform the monitoring the resource usage data for the hypervisor, the monitoring the resource usage data for the guest machine, the identifying, the executing, the generating, and the providing.

14. A computer program product for identifying the root cause of outliers representing excess computing usage in a virtual machine system, the computer program product comprising a computer readable storage medium having program instructions embodied therewith, the program instructions executable by a computing device to cause the computing device to:
    monitor resource usage data for a hypervisor;
    monitor resource usage data for a guest machine;
    identify both outliers in the resource usage data for the hypervisor and outliers in the resource usage data for the guest machine, wherein the outliers represent excessive computing resource utilization by a server device hosting the hypervisor and the guest machine;
    execute a root cause model based on both the resource usage data for the hypervisor and the resource usage data for the guest machine;
    on condition that a first set of time series data associated with the hypervisor and a second set of time series data associated with the guest machine are determined to include one or more contiguous time series points, provide the first set of time series data, the second set of time series data, and the contiguous time series points as inputs to a directed acyclic graph to determine whether the outliers are a result of a spinning process or genuine workload;
    generate a root cause report identifying results of the executed root cause model and the acyclic graph, wherein the root cause report identifies a root cause of both the outliers in the resource usage data for the hypervisor and the outliers in the resource usage data for the guest machine; and
    provide the root cause report for display to provide information to an administrator to take corrective action to address an issue related to the root cause of the outliers in the resource usage data for the hypervisor and the outliers in the resource usage data for the guest machine.

15. The computer program product of claim 14, wherein the program instructions further cause the computer device to:
    correlate the resource usage data usage for the hypervisor with the resource usage data for the guest machine; and
    determine whether contiguous time series points are present between the resource usage data usage for the hypervisor and the resource usage data for the guest machine based on the correlating,
    wherein the executing the root cause model cause the computer device to:
        execute a single instance of the root cause model using the resource usage data usage for the hypervisor and the resource usage data for the guest machine as inputs when the contiguous time series points exist; and
        execute separate instances of the root cause model using the resource usage data usage for the hypervisor and the resource usage data for the guest machine set as separate inputs to each instance of the root cause model when the contiguous time series points do not exist.

16. The computer program product of claim 14, wherein the program instructions further cause the computer device to:
    monitor combined resource usage data for the hypervisor and the guest machine;
    identify a set of outliers in the combined resource usage data;
    wherein the executing the root cause model causes the computing device to execute the root cause model using the resource usage data usage for the hypervisor, the resource usage data for the guest machine, and the combined resource usage data as inputs to the root cause model.

17. The computer program product of claim 14, wherein the root cause report indicates whether the excessive computing resource utilization is related to genuine workload or to a spinning process.

18. The computer program product of claim 14, wherein the root cause model or is selected from a group consisting of:
    a Bayesian network,
    a probability matrix, and
    an acyclic graph.

19. A system comprising:
    a CPU, a computer readable memory and a computer readable storage medium associated with a computing device;
    program instructions to receive a first set of time series data pertaining to a hypervisor and a second set of time series data pertaining to a guest associated with the hypervisor;
    program instructions to determine a first set of outliers in the first set of time series data, and a second set of outliers in the second set of time series data, program instructions to determine a correlation between the first set of time series data and the second set of time series data to determine whether the first set of time series data and the second set of time series data include one or more contiguous time series points;
    program instructions to, on condition that the first set of time series data and the second set of time series data are determined to include one or more contiguous time series points, provide the first set of time series data, the second set of time series data, and the contiguous time series points as inputs to a directed acyclic graph to determine whether the outliers are a result of a spinning process or genuine workload;
    program instructions to, on condition that the first set of time series data and the second set of time series data are determined to not include any contiguous time series points, separately provide the first set of time series data as input to a first instance of the directed acyclic graph and provide the second set of time series data as input to a second instance of the directed acyclic graph to determine whether the outliers are a result of a spinning process or genuine workload;

program instructions to generate a root cause report identifying results of the executed root cause model; and program instructions to provide the root cause report for display to provide information to an administrator to take corrective action to address an issue related to the root cause of the first set of outliers and the second set of outliers, wherein the program instructions are stored on the computer readable storage medium for execution by the CPU via the computer readable memory.

20. The system of claim 19, further comprising:

program instructions to receive a third set of time series data pertaining to the combined performance of the hypervisor and the guest associated with the hypervisor;

program instructions to determine a third set of outliers in the third set of time series data;

program instructions to determine a correlation between the third set of time series data and the first set of time series data and the second set of time series data to determine whether the third set of time series data includes one or more contiguous time series points with the first set of time series data and/or the second set of time series data; and on condition that the third set of time series data is determined to include one or more contiguous time series points with the first set of time series data and/or the second set of time series data, additionally providing the third set of time series data as input to the directed acyclic graph to determine whether the outliers are a result of a spinning process or genuine workload.

* * * * *